Nov. 7, 1944.　　　G. E. ARMINGTON　　　2,362,339
FLUID OPERATED SERVOMOTOR
Filed April 28, 1943
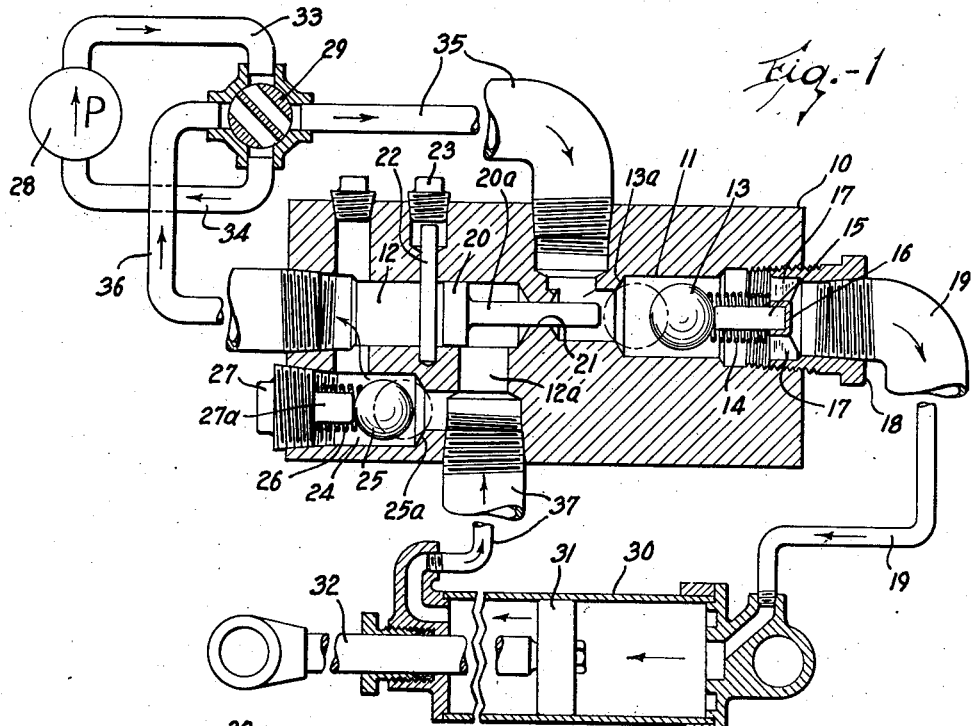
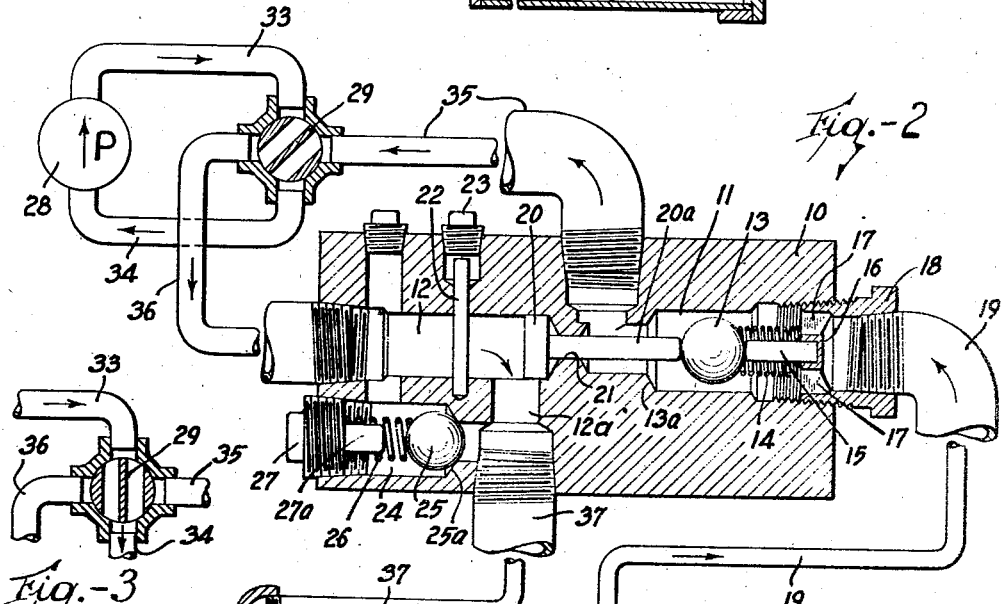
INVENTOR.
GEORGE E. ARMINGTON
BY
*Hyde and Meyer*
ATTORNEYS Patented Nov. 7, 1944

2,362,339

UNITED STATES PATENT OFFICE 2,362,339

FLUID OPERATED SERVOMOTOR

George E. Armington, South Euclid, Ohio, assignor to The Euclid Road Machinery Co., Euclid, Ohio, a corporation of Ohio Application April 28, 1943, Serial No. 484,831

3 Claims. (Cl. 121—40)

This invention relates to improvements in servomotor-operated check valve mechanism for controlling the flow to and from hydraulic jacks and the like. An object of the present invention is to provide a compact valve mechanism having a small number of parts and adapted for easy manufacture and installation and adapted to control flow in two directions to hydraulic jacks, rams and other devices of a similar nature.

One of the objects of the present invention is to provide in combination a double-acting hydraulic device, a main control valve for operating the device in opposite directions, and a device having two ball check valves and suitably arranged passageways, together with an actuator for a ball check in one passageway operated by fluid flow in another passageway, the result of the entire arrangement being such that the mere direction of flow through the device automatically sets the valves so that all of the fluid moves in the proper direction, and the setting of the main valve in a neutral position prevents drifting of the hydraulic device.

Other objects and advantages of the present invention will be apparent from the accompanying drawing and specification and the essential features thereof will be set forth in the appended claims.

In the drawing, Figs. 1 and 2 are somewhat diagrammatic views showing my improved check valve arrangement in a typical installation where a pump supplies fluid under pressure for operating a double acting ram or jack, Fig. 1 showing the parts set for operating the jack in one direction, and Fig. 2 showing the parts set to operate the jack in the opposite direction. Fig. 3 is a view showing the holding position of one of the valves of Figs. 1 and 2.

Referring to Fig. 1, a single small valve body 10 is provided with flow passageways 11 and 12. In the passageway 11 is a ball check valve 13 adapted in closed or dot-dash position to rest upon the seat 13a. A spring 14 normally urges the ball 13 to its seat and the movement of the ball away from its seat is limited by a stop pin 15 which is carried by a socket member 16 which in turn is supported by ribs 17 from an adapter 18 which serves for the connection of conduit 19 to the valve body.

In the passageway 12 there is arranged a piston 20 which is a snug sliding fit in the passageway 12. This piston is provided with a stem 20a which extends through a substantially liquid-tight opening 21 in the valve body which permits the stem to extend into the passageway 11 for engagement with the ball check 13. In the position of the parts shown in Fig. 1, the spring 14 acting through the ball 13 has moved the piston 20 toward the left so as to close the port 12a. This movement of piston 20 toward the left is limited by a stop pin 22 which is held in position by the plug 23. There is provided a by-pass 24 around the passageway 12 and in this by-pass is the ball check 25 which is normally urged by the spring 26 to closed position shown in dot-dash lines in Fig. 1 against the seat 25a. A stop pin 27a is an integral portion of the plug 27 which closes one of the openings by which the by-pass 24 is originally bored out.

To illustrate how my check valve device operates, I have shown it connected in a system wherein a pump 28 provides a flow of pressure fluid through a control valve 29 to operate the hydraulic jack 30. This jack is provided with a reciprocable piston 31 having a piston rod 32 connected to the device to be operated. Conduits 33 and 34 connect the pump with the control valve, conduit 35 connects the control valve with the passageway 11 of valve body 10, conduit 36 connects the control valve with the passageway 12 of the valve body 10, conduit 19 connects the passageway 11 with the right hand end of jack 30 and conduit 37 connects passageway 12 with the left hand end of jack 30.

With the control valve 29 set in the position of Fig. 1, my device operates as follows: Pressure fluid flows from the pump 28 through conduit 33, valve 29 and conduit 35 to the passageway 11. The pressure of the fluid lifts the ball 13 from its seat, whereupon the fluid flows through conduit 19 to the jack 30 and exerts pressure against the right-hand face of piston 31. The piston then moves toward the left, causing the hydraulic liquid to flow away from the left-hand end of jack 30 through conduit 37 to the valve body. There it raises ball check 25 from its seat as shown in full lines in Fig. 1, whereupon the liquid flows through the by-pass 24 to the passageway 12, then through conduit 36, valve 29 and conduit 34 back to the pump.

When valve 29 is turned to the position of Fig. 2, flow occurs in the opposite direction as follows: From pump 28 the flow is through conduit 33, valve 29, conduit 36 and passageway 12 against the left-hand face of piston 20. The piston is thus moved from the position of Fig. 1 to that of Fig. 2, opening the port 12a. The stem 20a of the piston engages ball check 13 and holds the same away from its seat as shown in Fig. 2. The liquid then flows through conduit 37 to the left-hand end of jack 30 and against the left face of piston 31. The piston moves toward the right, moving the hydraulic liquid before it and forcing it through conduit 19 through passageway 11 of the valve body 10 past the open valve 13, then through conduit 35, valve 29 and conduit 34 back to the pump.

In Fig. 3 I have illustrated the position to which valve 29 is turned when it is desired to hold the parts without moving. It will be noticed that in this "hold" position the passageways of valve 29 connect conduits 33 and 34 so that the flow from the pump 28 is through the valve 29 and directly back to the pump. Since the valve 29 may be made a little loose in order to operate freely, there may be a slight leakage through this valve is the "hold" position of Fig. 3. In this case, if it is desired to hold a load positively against drifting, the load should be held so that the piston 31 would move toward the right if any drifting occurred. This will force ball check 13 to its seat and thus effectually prevent drifting.

It will thus be seen that I have provided a very simple device for producing the same result which heretofore has been accomplished by much more complicated devices. Furthermore, nothing is necessary to connect the valve body 10 in a hydraulic system except to connect the conduits 19, 35, 36 and 37 to the suitable openings in the valve body 10. My improved device has only a few moving parts and is cheap to manufacture and simple to assemble.

What I claim is:

1. Valve means comprising a single valve body provided with two openings for the connection of a first supply line, there being a first passageway in said body communicating between said openings, a check valve in said passageway normally permitting flow in said passageway in one direction only, said valve body being provided with two other openings for the connection of a second supply line, there being a pair of passageways in said body communicating in parallel between said two other openings, a check valve in one of said pair of passageways permitting flow in said second supply line therethrough in one direction only, there being an expansible chamber device in the other of said pair of passageways movable by fluid flow in said second supply line in the opposite direction, and means extending from said device into said first passageway for opening said first named check valve upon said movement of said device.

2. Valve means comprising a single valve body provided with two openings for the connection of a first supply line, there being a first passageway in said body communicating between said openings, a check valve in said passageway normally permitting flow in said passageway in one direction only, spring means urging said valve toward its seat, said valve body being provided with two other openings for the connection of a second supply line, there being a pair of passageways in said body communicating in parallel between said two other openings, one of said pair of passageways providing a cylinder in axial alinement with said check valve, a piston fitted in said cylinder, said piston having a stem extending through a substantially leak-proof bore in said body into said first passageway and engaging said check valve, there being a port in said cylinder forming part of said one of said pair of passageways, said piston normally closing said port to flow through said one of said pair of passageways when said valve is closed, said piston being movable by fluid flow in said second supply line in one direction to open said valve and to open said port to said flow, and a check valve in the other of said pair of passageways permitting flow in said second supply line in the opposite direction only.

3. Valve means comprising a single valve body provided with two openings for the connection of a first supply line, there being a first passageway in said body communicating between said openings, a check valve in said passageway normally permitting flow in said passageway in one direction only, said valve body being provided with two other openings for the connection of a second supply line, there being a pair of passageways in said body communicating in parallel between said two other openings, a check valve in one of said pair of passageways permitting flow in said second supply line therethrough in one direction only, there being an expansible chamber device responsive to flow in the other of said pair of passageways and movable by fluid flow in said second supply line in the opposite direction, and an operative connection between said device and said first-named check valve for opening the latter by said movement of said device.

GEORGE E. ARMINGTON.